(12) United States Patent
Kim

(10) Patent No.: US 9,349,350 B2
(45) Date of Patent: May 24, 2016

(54) METHOD FOR PROVIDING CONTENTS ALONG WITH VIRTUAL INFORMATION AND A DIGITAL DEVICE FOR THE SAME

(71) Applicant: LG ELECTRONICS INC., Seoul (KR)

(72) Inventor: Yongsin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 381 days.

(21) Appl. No.: 13/683,405

(22) Filed: Nov. 21, 2012

(65) Prior Publication Data

US 2014/0111543 A1    Apr. 24, 2014

(30) Foreign Application Priority Data

Oct. 24, 2012  (KR) .......................... 10-2012-0118352

(51) Int. Cl.
*G09G 5/377* (2006.01)
*G06F 3/147* (2006.01)
*G09G 5/34* (2006.01)

(52) U.S. Cl.
CPC ................ *G09G 5/377* (2013.01); *G06F 3/147* (2013.01); *G09G 5/34* (2013.01)

(58) Field of Classification Search
None
See application file for complete search history.

(56) References Cited

U.S. PATENT DOCUMENTS

| 6,268,864 | B1 * | 7/2001 | Chen ....................... G06T 13/80 |
| | | | 345/428 |
| 2004/0179104 | A1 * | 9/2004 | Benton .................... 348/207.99 |
| 2007/0238981 | A1 | 10/2007 | Zhu et al. |
| 2007/0294622 | A1 * | 12/2007 | Sterner et al. ................. 715/716 |
| 2008/0147325 | A1 | 6/2008 | Maassel et al. |
| 2011/0300876 | A1 | 12/2011 | Lee et al. |
| 2012/0122491 | A1 * | 5/2012 | Kim et al. .................. 455/456.3 |
| 2012/0224060 | A1 | 9/2012 | Gurevich et al. |
| 2012/0226437 | A1 | 9/2012 | Li et al. |

* cited by examiner

*Primary Examiner* — Kee M Tung
*Assistant Examiner* — Yi Wang
(74) *Attorney, Agent, or Firm* — Birch, Stewart, Kolasch & Birch, LLP

(57) ABSTRACT

A method for providing contents and a digital device for the same in which image data are displayed and navigated together with augmented reality information surrounded by a point where the corresponding image data are recorded.

22 Claims, 11 Drawing Sheets

METHOD FOR PROVIDING CONTENTS ALONG WITH VIRTUAL INFORMATION AND A DIGITAL DEVICE FOR THE SAME

This application claims the benefit of the Korean Patent Application No. 10-2012-0118352, filed on Oct. 24, 2012, which is hereby incorporated by reference as if fully set forth herein.

BACKGROUND OF THE INVENTION

1. Field of the Invention

The present invention relates to a method for providing contents and a digital device for the same, and more particularly, to a method for providing contents and a digital device for the same, in which image data included in contents are displayed and navigated together with augmented reality information surrounded by a point where the corresponding image data are recorded.

2. Discussion of the Related Art

Augmented reality is the technology that displays image or background of reality together with virtual information. Unlike the virtual reality technology in which object, background and environment are provided as virtual images, the augmented reality technology provides a user with realer additional information than the actual environment by mixing a virtual object with an actual environment. For example, if the user illuminates surroundings of the road through a camera of a digital device while walking the road, information on buildings and road information included in images collected in the camera may be provided to the user. This augmented reality technology has received much more attention as a portable device has been recently spread.

SUMMARY OF THE INVENTION

Accordingly, the present invention is directed to a method for providing contents and a digital device for the same, which substantially obviate one or more problems due to limitations and disadvantages of the related art.

An object of the present invention is to provide a method for providing contents and a digital device for the same in which image data are displayed through a digital device together with augmented reality information of an object included in the corresponding image data.

Another object of the present invention is to provide a method for providing contents and a digital device for the same in which image data are navigated through a digital device together with augmented reality information surrounded by a point where the image data are recorded.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for providing contents comprises the steps of acquiring contents including at least one image data; acquiring additional data of the contents, the additional data including position information and direction information of a recording device when the image data included in the contents are recorded; acquiring virtual information corresponding to position information of the image data, the virtual information including augmented reality information on at least one object surrounded by a point corresponding to the position information; displaying the image data included in the contents; setting a reference direction of a current digital device that displays the image data; detecting direction change information of the current digital device with respect to the reference direction; and displaying virtual information in a target direction based on the detected direction change information of the current digital device and direction information of the image data.

In another aspect of the present invention, a digital device comprises a processor controlling an operation of the digital device; a display unit outputting an image on the basis of a command of the processor; and a sensor unit sensing a direction of the digital device and transferring the sensed result to the processor, wherein the processor acquires contents including at least one image data, acquires additional data of the contents, the additional data including position information and direction information of a recording device when the image data included in the contents are recorded, acquires virtual information corresponding to position information of the image data, the virtual information including augmented reality information on at least one object surrounded by a point corresponding to the position information, displays the image data included in the contents on the display unit, sets a reference direction of the digital device, detects direction change information of the digital device with respect to the reference direction, and displays virtual information in a target direction based on the detected direction change information of the digital device and direction information of the image data.

According to the method for providing contents in accordance with the embodiment of the present invention, the digital device may display image data together with augmented reality information associated with the image data. As a result, information on objects included in the image data may easily be provided to the user.

Also, according to the embodiment of the present invention, augmented reality information surrounded by a point where image data are recorded is provided on the basis of direction change of the current digital device that displays the image data. Accordingly, the user may navigate the augmented reality information as if he/she is located in the place where the corresponding image data are recorded.

Also, according to the embodiment of the present invention, augmented reality information in the corresponding point may be received in real time by using position information of a recording device when the image data are recorded. Accordingly, the user may receive the latest augmented reality information surrounded by the corresponding point through the digital device.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Although the terms used in the present invention are selected from generally known and used terms considering their functions in the present invention, the terms can be modified depending on intention of a person skilled in the art, practices, or the advent of new technology. Also, in special case, the terms mentioned in the description of the present invention may be selected by the applicant at his or her discretion, the detailed meanings of which are described in relevant parts of the description herein. Accordingly, the terms used herein should be understood not simply by the actual terms used but by the meaning lying within and the description disclosed herein.

The present invention is intended to display image data through a digital device together with virtual information of objects included in the corresponding image data. Also, the present invention is to provide a method for navigating virtual information of image data displayed through a digital device and virtual information of a zone surrounded by a point where the corresponding image data are recorded. In the present invention, the virtual information includes augmented reality information on a specific object.

Figure 1:
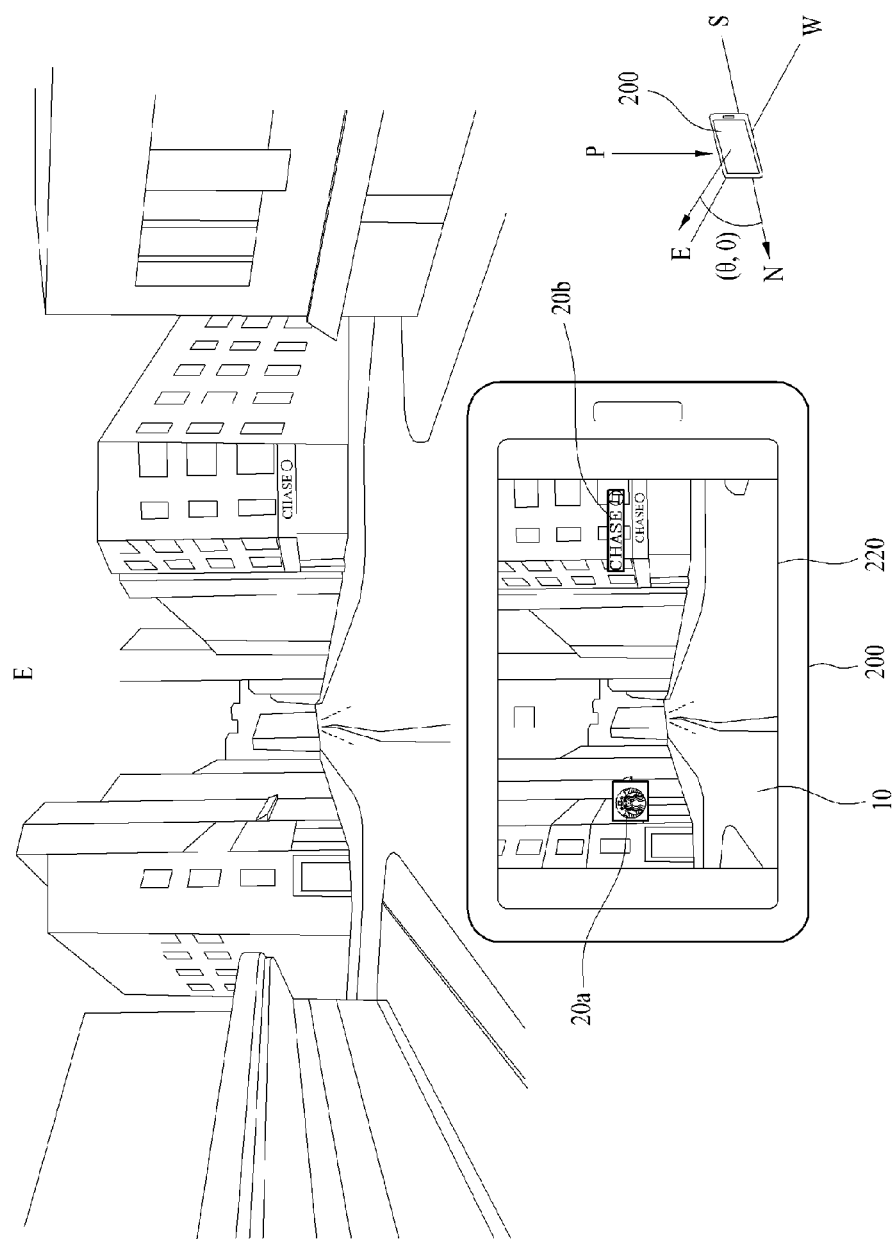
FIG. 1 is a diagram illustrating that a recording device records image data in accordance with the embodiment of the present invention.

FIG. 1 is a diagram illustrating that a recording device 200 records image data 10 in accordance with the embodiment of the present invention.

Referring to FIG. 1, the recording device 200 may record contents, which include image data 10, by using a camera unit (not shown). At this time, examples of the contents recorded by the recording device 200 may include photos, moving pictures, and still images. Also, various types of contents including at least one image data 10 may be recorded by the recording device 200. In the embodiment of the present invention, a user may record images of various types of objects such as a specific building and specific road by using the recording device 200. The image data 10 of the present invention are generated through the recorded images.

In the meantime, virtual information 20a and 20b corresponding to at least one object included in the image data 10 may exist in the at least one object. In the present invention, the virtual information 20a and 20b includes augmented reality information included in the image data 10. For example, the virtual information 20a and 20b may include various kinds of information such as name, type of business and business hours on a specific store on the image data 10. The present invention is not limited to the above example. If the recording device 200 provides an augmented reality function, the virtual information 20a and 20b may be displayed on a display unit 220 of the recording device 200 together with the image data 10. According to one embodiment of the present invention, the recording device 200 may record the virtual information 20a and 20b of the object included in the image data 10 when recording the image data 10.

According to the embodiment of the present invention, the recording device 200 detects position information P of the corresponding recording device 200 when recording the image data 10. The position information P of the recording device 200 may be the position information of the point where the recording device 200 is located on a global positioning system (GPS). The recording device 200 may detect the position information P by using a GPS receiving device. According to another embodiment of the present invention, the recording device 200 may indirectly detect its position information P through a network connected therewith.

In addition, the recording device 200 detects direction information (θ, 0) together with the image data 10 when recording the image data 10. In the embodiment of the present invention, the direction information (θ, 0) of the recording device 200 includes at least one of panning angle information and tilting angle information of the recording device 200. At this time, the panning angle information and the tilting angle information represent an angle between the direction of the recording device 200 and a first reference direction. In the embodiment of the present invention, the direction of the recording device 200 may be set in various manners. For example, a recording direction of the camera unit of the recording device 200 may be set to the direction of the recording device 200. Also, according to the embodiment of the present invention, the first reference direction may be set to a specific orientation (for example, northern direction), altitude (for example, altitude 0°), or their combination. Accordingly, the recording device 200 may detect its panned angle on the basis of a specific orientation, that is, northern (N) direction. Also, the recording device may detect its tilting angle on the basis of a specific altitude, that is, altitude 0°. In the embodiment of FIG. 1, the recording device 200 has a panning angle of θ and a tilting angle of 0° with reference to the first reference direction. Accordingly, in FIG. 1, the direction information of the recording device 200 becomes (θ, 0).

The recording device 200 may include at least one of a compass sensor and a gyroscope sensor, and may detect at least one of its panning angle information and tilting angle information by using a sensor provided therein. However, the first reference direction and the direction of the recording device 200 are only exemplary to describe a method for obtaining the direction information (θ, 0), and various modifications may be made in the first reference direction and the direction of the recording device 200.

The recording device 200 of the present invention stores the position information (P) and the direction information (θ, 0) when recording the image data 10. The contents of the present invention, which include at least one image data 10, may have at least one position information (P) and direction information (θ, 0) corresponding to each image data 10. The at least one position information (P) and direction information (θ, 0) may be stored together as additional data of the corresponding contents.

In the meantime, according to another embodiment of the present invention, the direction information of the image data 10 may further include altitude information of the recording device 200 as well as panning angle information and tilting angle information of the recording device 200. Even though the recording device 200 has the same panning angle and tilting angle at the same point P, if the recording device 200 is located on different altitudes, different image data 10 may be recorded in the corresponding recording device 200. Accordingly, the recording device 200 may detect its altitude information when recording the image data 10, and may allow the detected altitude information to be included in the direction information of the image data 10. To this end, the recording device 200 may include various kinds of sensors for detecting altitude information.

Figure 2:
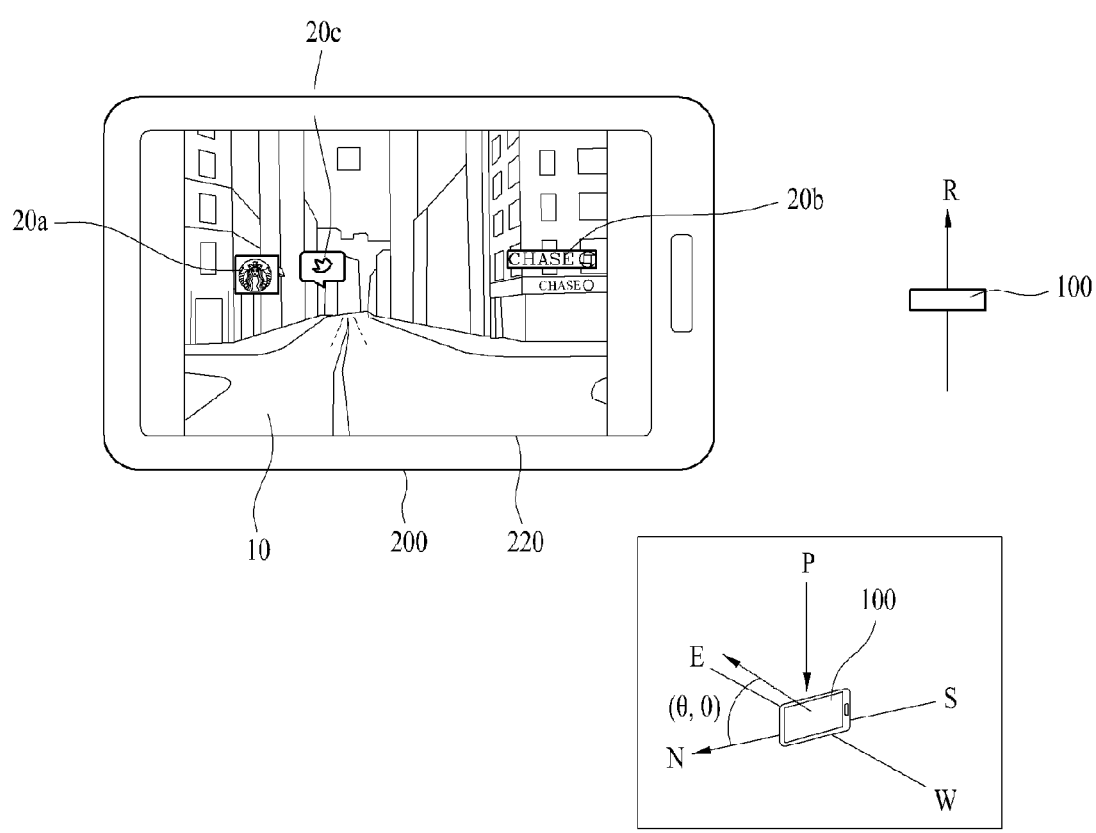
FIG. 2 is a diagram illustrating a digital device that displays image data in accordance with the embodiment of the present invention.

FIG. 2 is a diagram illustrating a digital device 100 that displays image data 10 in accordance with the embodiment of the present invention.

In the embodiment of the present invention, the digital device 100 may include a display unit 120, and may display the image data 10 through the display unit 120. The digital device 100 may acquire contents, which include at least one image data 10. According to one embodiment of the present invention, the digital device 100 may be the same device as the recording device 200 of FIG. 1. Accordingly, the digital device 100 may acquire contents through the recording procedure described in FIG. 1. Also, according to another embodiment of the present invention, the digital device 100 may receive the contents from an external device or server.

The digital device 100 acquires additional data of the contents together with the contents. The additional data may include position information (P) and direction information (θ, 0) when recording the image data 10 included in the contents. If the digital device 100 is the same device as the recording device 200 of FIG. 1, it may acquire the position information (P) and direction information (θ, 0) through the detecting procedure described in FIG. 1. Also, according to another embodiment of the present invention, the digital device 100 may receive the position information (P) and direction information (θ, 0) from the external device or server.

The digital device 100 of the present invention may display the image data 10 included in the contents. At this time, the digital device 100 may display the image data together with virtual information 20a, 20b and 20c corresponding to the image data 10. To this end, the digital device 100 may receive the virtual information 20a, 20b and 20c from the server by using the position information (P) of the image data 10. In other words, the digital device 100 transmits the position information (P) of the image data 10 to the server, and receives the virtual information corresponding to the corresponding position information (P) from the server. At this time, the received virtual information may include augmented reality information on at least one object surrounded by the point corresponding to the corresponding position information (P). For example, the received virtual information may include augmented reality information on surrounding objects located within a certain distance based on the point corresponding to the corresponding position information (P). The surrounding objects may include objects located on every side based on the point.

If the virtual information is received, the digital device 100 may determine virtual information which will be displayed on the display unit, by using the direction information (θ, 0) of the image data 10. In other words, the digital device 100 may display the virtual information located in the direction (θ, 0) based on the point P, among the virtual information corresponding to the position information (P), through the display unit 120. Accordingly, the digital device 100 may display the image data 10 on the display unit 120 together with the virtual information 20a, 20b and 20c corresponding to the image data 10. In the meantime, according to the embodiment of the present invention, the digital device 100 may receive the virtual information from the server by using the position information (P) of the image data 10. Accordingly, the digital device 100 may display the virtual information 20c, which is updated after recording, as well as the virtual information 20a and 20b existing when recording the image data 10.

According to another embodiment of the present invention, the recording device 200 of FIG. 1 may record the image data 10 together with the virtual information 20a and 20b, and the digital device 100 of FIG. 2 may display the recorded virtual information 20a and 20b together with the image data 10.

In the meantime, according to the embodiment of the present invention, the user may navigate surrounding information of the image data 10 by using the digital device 100. In other words, the user may navigate augmented reality information surrounded by the point P where the image data 10 are recorded, by using the digital device 100. To this end, the digital device 100 sets a reference direction R of the digital device 100 at a specific timing point. The reference direction is the direction of the digital device 100 at the specific timing point. In the embodiment of the present invention, the direction of the digital device 100 may be set in various manners. For example, the direction of the digital device 100 may be an opposite direction of a display direction of the image data 10 displayed by the display unit 120 of the digital device 100. In other words, according to the embodiment of the present invention, the user may set a viewing direction of the display unit 120 of the digital device 100 to the direction of the digital device 100. However, the method for setting the reference direction R of the digital device 100 is one embodiment of the present invention, and various modifications may be made in the method.

In the embodiment of the present invention, the timing point when the reference direction R is set may be set in various manners. For example, the digital device 100 may set its direction to the reference direction R at the time when the image data 10 are paged. Alternatively, the digital device 100 may set its direction to the reference direction R at the time when a separate user input for navigating surrounding information of the image data 10 is received.

In this way, if the reference direction R of the digital device 100 is set, the reference direction R may be synchronized with the direction information (θ, 0) of the image data 10. In other words, the digital device 100 oriented towards the reference direction R becomes the state that it is oriented towards the direction (θ, 0) at the recording point P of the image data 10. Accordingly, if the digital device 100 is oriented towards the reference direction R, it displays the virtual objects 20a, 20b and 20c, which are oriented towards the direction (θ, 0) at the point P, on the display unit 120.

Next, the digital device 100 detects its direction change information on the reference direction R. The direction change information includes at least one of panning angle information and tilting angle information of the digital device 100 with respect to the reference direction R. In other words, the digital device 100 detects at least one of the panning angle and the tilting angle between the direction of the digital device 100 and the reference direction R in real-time by using the reference direction R as the second reference direction of the present invention. In the embodiment of the present invention, the digital device 100 may include at least one of a compass sensor and a gyroscope sensor, and may detect at least one of the panning angle information and the tilting angle information by using the sensor.

The digital device 100 displays virtual information in a target direction based on the detected direction change information and the direction information (θ, 0) of the image data 10. In more detail, the digital device 100 acquires the target direction by compensating for at least one of the detected panning angle information and tilting angle information with respect to the direction information (θ, 0) of the image data 10. The digital device 100 displays the virtual information located in the target direction, from the received virtual information, on the display unit 120. In other words, the digital device 100 may display the virtual information located in the target direction, from the surrounding virtual information based on the point P. Accordingly, according to the embodiment of the present invention, when the direction of the digital device 100 is changed from the reference direction R, it may be advantageous in that the direction change of the digital device 100 is made in the direction (θ, 0) of the point P. The embodiment for displaying virtual information in accordance with direction change information of the digital device 100 will be described in more detail with reference to FIG. 3 to FIG. 6.

Figure 3:
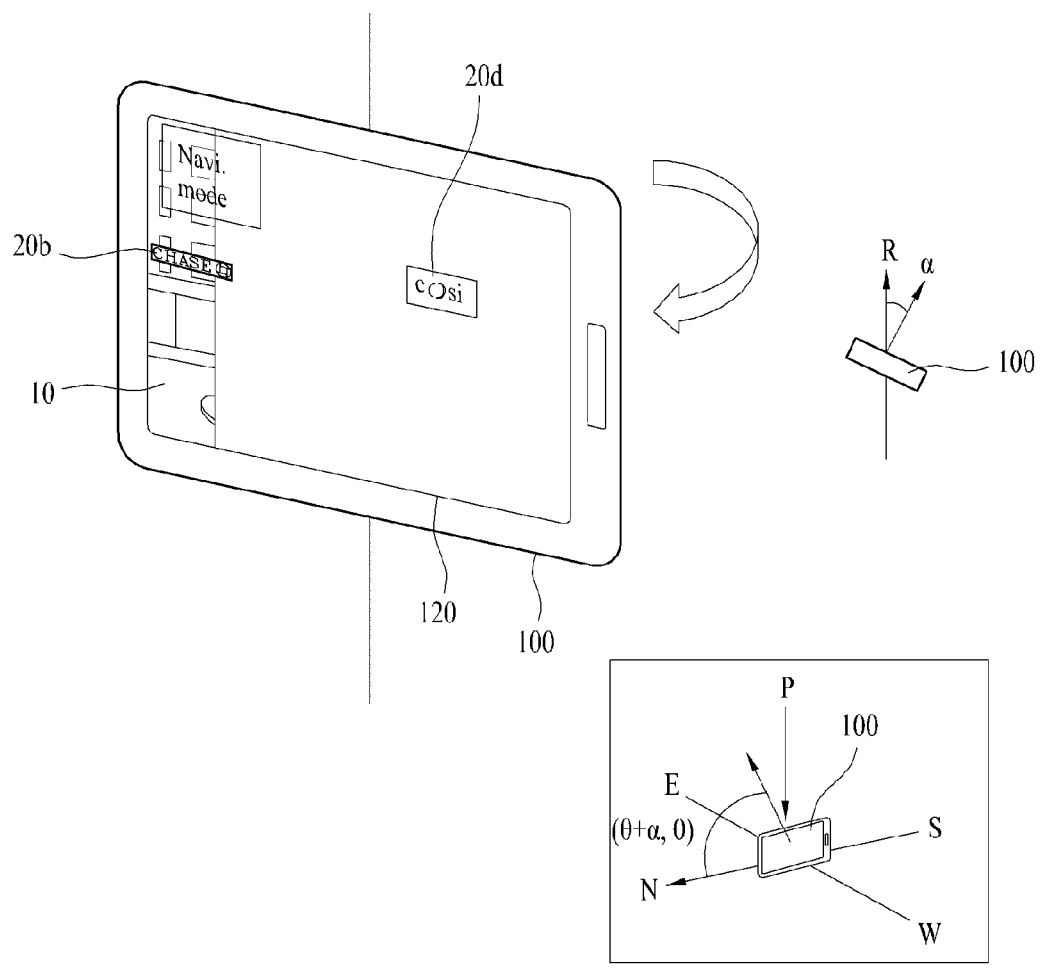
FIG. 3 is a diagram illustrating that virtual information is displayed through a digital device in accordance with one embodiment of the present invention.

FIG. 3 is a diagram illustrating that virtual information is displayed through a digital device 100 in accordance with one embodiment of the present invention.

As described in FIG. 2, if the reference direction R of the digital device 100 is set, the digital device 100 detects its direction change information with respect to the reference direction R. In the embodiment of FIG. 3, the user may tilt the digital device 100 towards the right side. At this time, the digital device 100 is subjected to panning at an angle of 'α' clockwise with respect to the reference direction R.

The digital device 100 acquires a target direction of (θ+α, 0) by compensating for the detected direction change information 'α' with respect to panning angle information θ of the direction information (θ, 0) of the image data 10. At this time, the virtual information 20b and 20d may exist in the target direction (θ+α, 0) at the point P where the image data 10 are recorded. The digital device 100 displays the virtual information 20b and 20d located in the target direction (θ+α, 0) on the display unit 120. Accordingly, the digital device 100 of the present invention may provide the user with the virtual information the same as that actually viewed in the direction (θ+α, 0) at the point P.

In the meantime, when the digital device 100 is subjected to panning towards the right side in FIG. 3, it may display the image data 10 displayed on the display unit 120 by shifting the image data 10 to its left side. At this time, the digital device 100 may shift the image data 10 on the display unit 120 in accordance with its panning angle. Accordingly, the digital device 100 may display the image data 10 to be fixed in the reference direction R.

Although the method for displaying virtual information when panning of the digital device 100 is made has been described in the embodiment of FIG. 3, the present invention is not limited to the embodiment of FIG. 3. In other words, when the digital device 100 is tilted, the virtual information may be displayed in the same manner even though tilting and panning of the digital device 100 are made at the same time.

Figure 4:
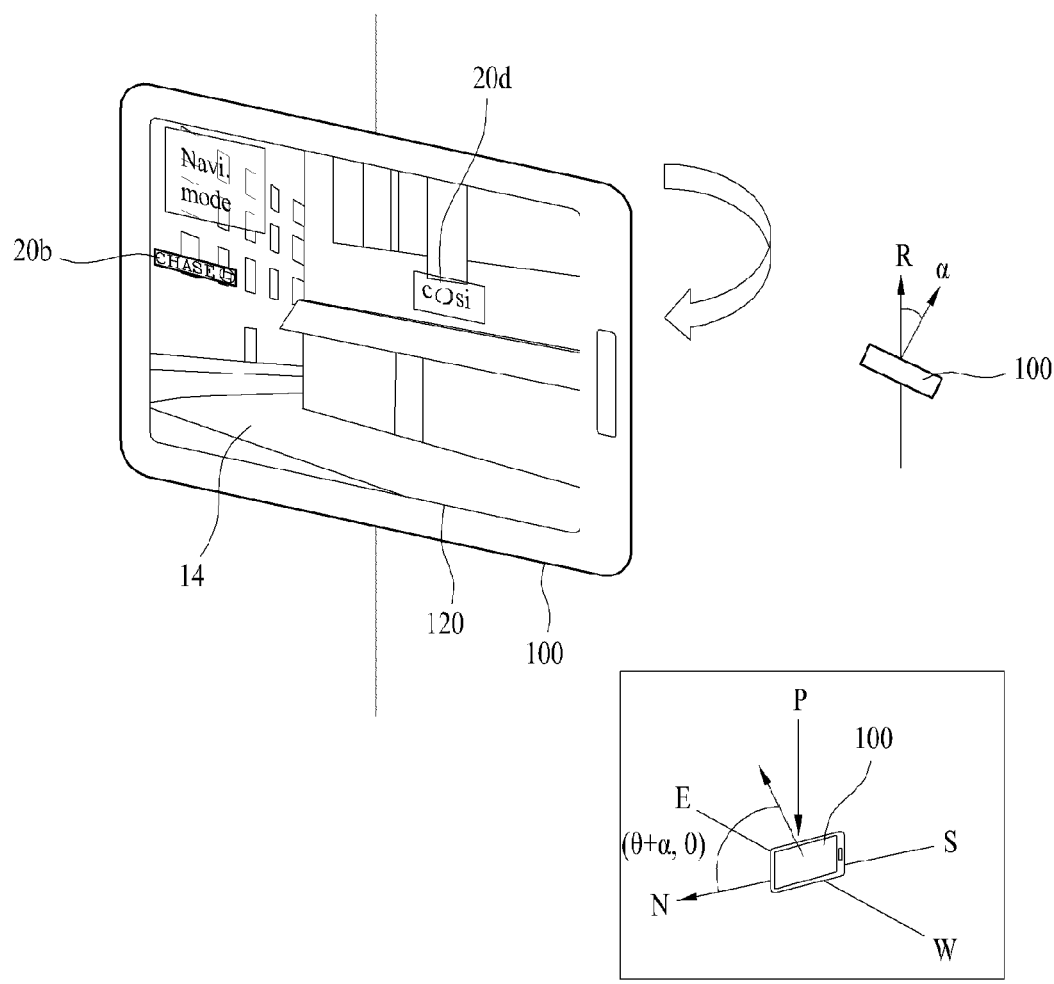
FIG. 4 to FIG. 6 are diagrams illustrating that virtual information is displayed through a digital device in accordance with another embodiment of the present invention.
Figure 5:
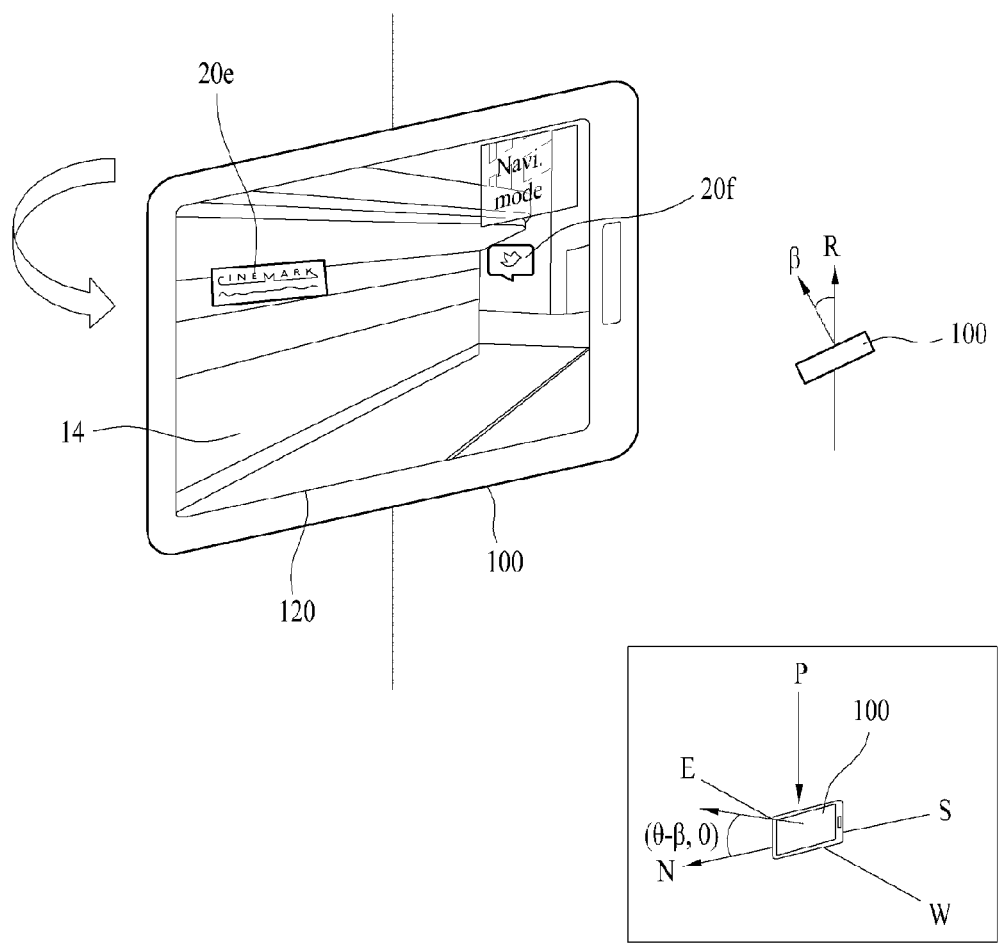
Figure 6:
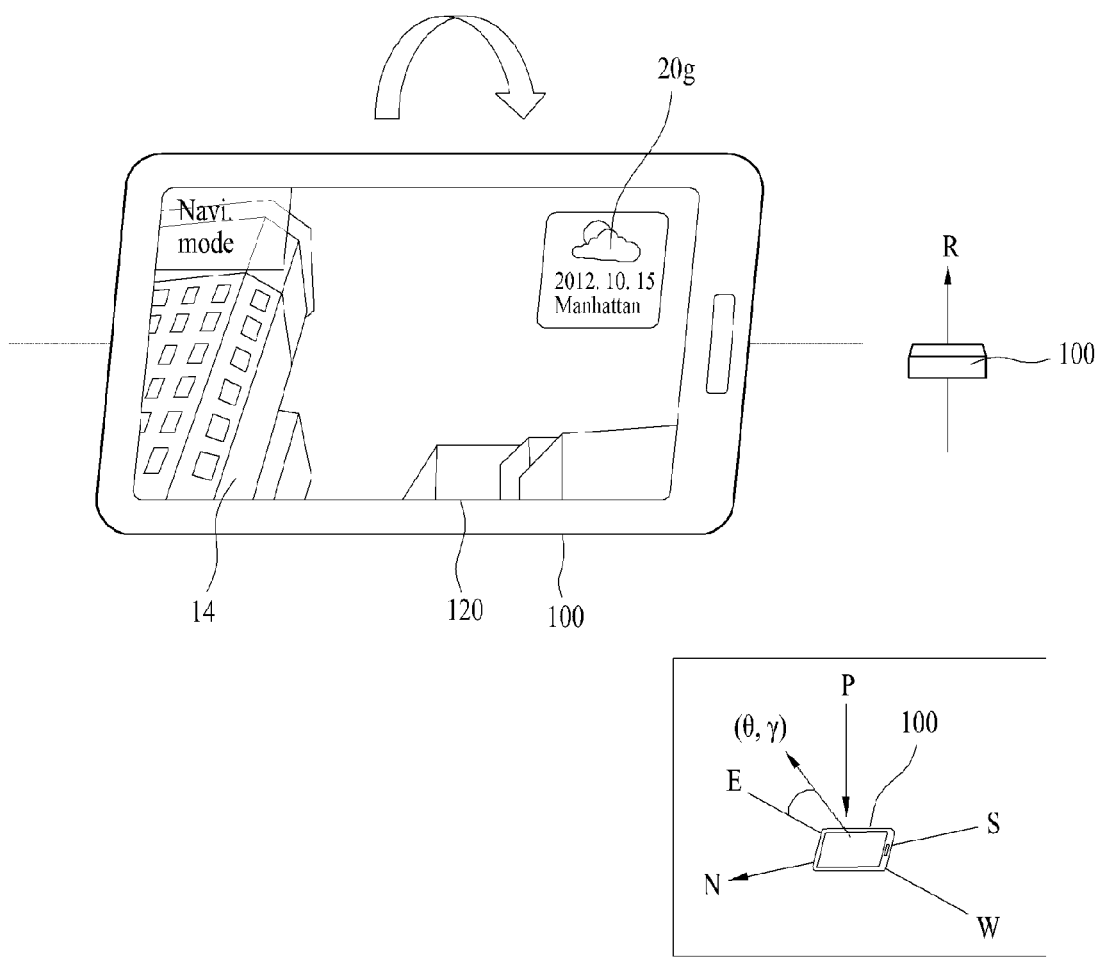

FIG. 4 to FIG. 6 are diagrams illustrating that virtual information is displayed through a digital device 100 in accordance with another embodiment of the present invention.

According to the embodiment of FIG. 4 to FIG. 6, the digital device 100 may receive surrounding view data corresponding to the position information P of the image data, and may display the surrounding view data on the display unit 120 on the basis of its target direction. In the present invention, the surrounding view data include image data on surroundings viewed from a point corresponding to the position information P. The digital device 100 of the present invention may receive surrounding view data corresponding to the position information P from the server.

First of all, as shown in FIG. 4, if the user tilts the digital device 100 towards the right side, the digital device 100 is subjected to panning at an angle of α clockwise with respect to the reference direction R. The digital device 100 detects its direction change information α. Then, the digital device 100 acquires a target direction of (θ+α, 0) by compensating for the detected direction change information 'α' with respect to panning angle information θ of the direction information (θ, 0) of the image data 10. At this time, the virtual information 20b and 20d may exist in a zone located in the target direction (θ+α, 0) at the point P where the image data 10 are recorded. The digital device 100 displays the virtual information 20b and 20d located in the target direction (θ+α, 0) on the display unit 120.

In the meantime, according to the embodiment of FIG. 4, the digital device 100 may display view data 14 of the zone located in the target direction (θ+α, 0), from the received surrounding view data, through the display unit 120. In other words, the digital device 100 may display the view data 14 of the target direction (θ+α, 0) and the virtual information 20b and 20d of the target direction (θ+α, 0) on the display unit 120. Accordingly, the digital device 100 of the present invention may provide the user with view image the same as that actually viewed in the direction (θ+α, 0) at the point P and the virtual information corresponding to the view image.

Likewise, as shown in FIG. 5, if the user tilts the digital device 100 towards the left side, the digital device 100 is subjected to panning at an angle of β counterclockwise with respect to the reference direction R. The digital device 100 detects its direction change information β. Then, the digital device 100 acquires a target direction of (θ−β, 0) by compensating for the detected direction change information 'β' with respect to panning angle information θ of the direction information (θ, 0) of the image data 10. At this time, the virtual information 20e and 20f may exist in a zone located in the target direction (θ−β, 0) at the point P where the image data 10 are recorded. The digital device 100 displays the virtual information 20e and 20f located in the target direction (θ−β, 0) on the display unit 120. Also, the digital device 100 may display view data 14 of the zone located in the target direction (θ−β, 0), from the received surrounding view data, on the display unit 120 together with the virtual information 20e and 20f.

In the meantime, in the embodiment of FIG. 4 and FIG. 5, clockwise panning of the digital device 100 has been described as positive compensation of panning angle information, and counterclockwise panning of the digital device 100 has been described as negative compensation of panning angle information. However, the present invention is not limited to the embodiment of FIG. 4 and FIG. 5. In other words, clockwise panning of the digital device 100 has been described as negative compensation of panning angle information, and counterclockwise panning of the digital device 100 has been described as positive compensation of panning angle information.

Next, referring to FIG. 6, the digital device 100 may detect its tilting angle information as well as its panning angle information. As shown in FIG. 6, if the user tilts the digital device 100 upwardly, the digital device 100 is titled upwardly at an angle of γ with respect to the reference direction R. The digital device 100 detects its direction change information γ. Then, the digital device 100 acquires a target direction of (θ, γ) by compensating for the detected direction change information 'γ' with respect to tilting angle information 0° of the direction information (θ, 0) of the image data 10. At this time, virtual information 20g may exist in a zone located in the target direction (θ, γ) at the point P where the image data 10 are recorded. The digital device 100 displays the virtual information 20g located in the target direction (θ, γ) on the display unit 120. Also, the digital device 100 may display view data 14 of the zone located in the target direction (θ, γ), from the received surrounding view data, on the display unit 120 together with the virtual information 20g.

In the meantime, in FIG. 3 to FIG. 6, it has been assumed that the panning angle information in the direction information of the image data is θ and the tilting angle information is 0. However, various angles may be applied to the direction information of the image data 10. According to the embodiment of the present invention, the direction information of the image data 10 may include any one of the panning angle information and the tilting angle information of the recording device, or may include both of them Also, according to another embodiment of the present invention, the direction information of the image data 10 may further include altitude information of the recording device.

Also, in the embodiment of the present invention, the virtual information 20 includes various kinds of augmented reality information. In other words, the virtual information may include information (for example, name, type of business and business hours of a corresponding store) on a specific building or store, and its examples are 20a, 20b, 20d and 20e. Also, the virtual information may include message information from the user or a follower of the user with respect to a specific building, and its examples are 20c and 20f. Moreover, the virtual information may include current weather information of the corresponding point P and its example is 20g.

As described above, according to the embodiment of the present invention, the user may navigate the virtual information 20 surrounded by the image data 10 through the digital device 100. Also, the user may navigate view data 14 surrounded by the image data 10 together with the virtual information through the digital device 10. The digital device 100 of the present invention provides reality as if the user is located at the point P to look around the surrounding through the digital device 100.

Figure 7:
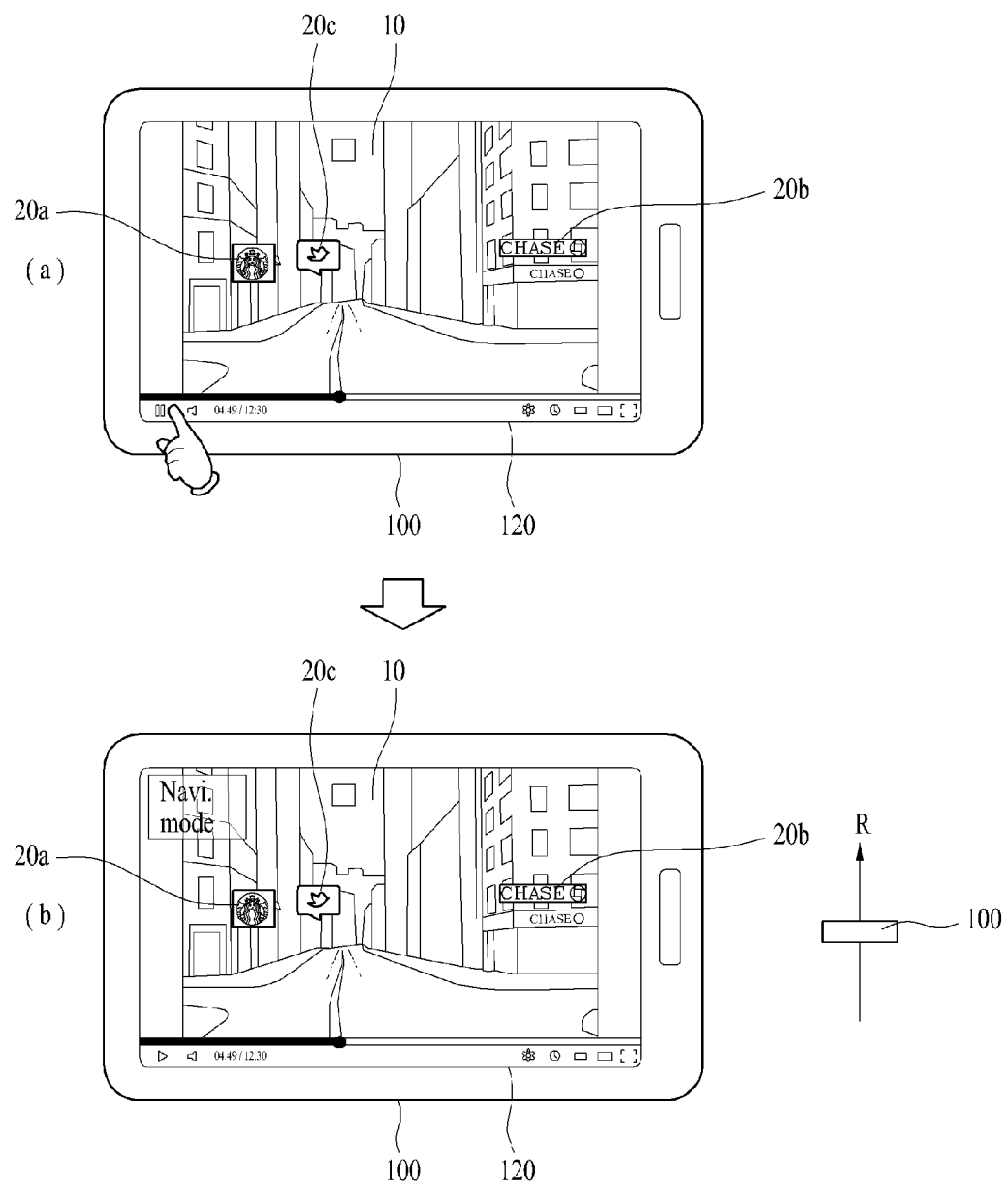
FIG. 7 is a diagram illustrating a method for setting a reference direction of a digital device in accordance with one embodiment of the present invention.

FIG. 7 is a diagram illustrating a method for setting a reference direction R of a digital device 100 to navigate virtual information 20 surrounded by a zone corresponding to image data 10 in accordance with one embodiment of the present invention.

According to one embodiment of the present invention, the digital device 100 may set its direction at the time when the image data 10 are paged, to the reference direction R. In the embodiment of the present invention, examples of contents include photos, moving pictures, and still images. Also, various types of contents including at least one image data 10 are provided. In the present invention, various methods for paging image data 10 included in the contents on a digital device 100 may exist. For example, if the contents are photos, the image data 10 may be paged by an input of a user who selects a photo of the corresponding image data 10 from a plurality of photos. Also, if the contents are moving pictures, the image data may be paged by an input of a user who pauses the moving pictures from a frame of the corresponding image data 10 while playing the moving pictures.

As shown in FIG. 7, if the contents of the present invention are moving pictures, the digital device 100 may page the image data 10 by receiving a user input that pauses the moving pictures, and may switch a current mode to a navigating mode of the virtual information 20 corresponding to the corresponding image data 10. In other words, as shown in FIG. 7(a), if the user input that pauses moving pictures is received while the corresponding moving pictures are being played, the digital device 100 may display the image data 10 on the display unit 120 as shown in FIG. 7(b). Also, in a state that the digital device 100 displays the image data 10 on the display unit 120, the digital device 100 switches the current mode to a navigating mode that may detect the virtual information 20 surrounded by the point where the image data 10 are recorded. At this time, the digital device 100 may set its direction when the user input pausing the moving pictures is received to the reference direction R. Afterwards, the digital device 100 may detect at least one of the panning angle information and the tilting angle information with respect to the set reference direction R, and may display the virtual information 20 surrounded by the zone corresponding to the image data 10.

Figure 8:
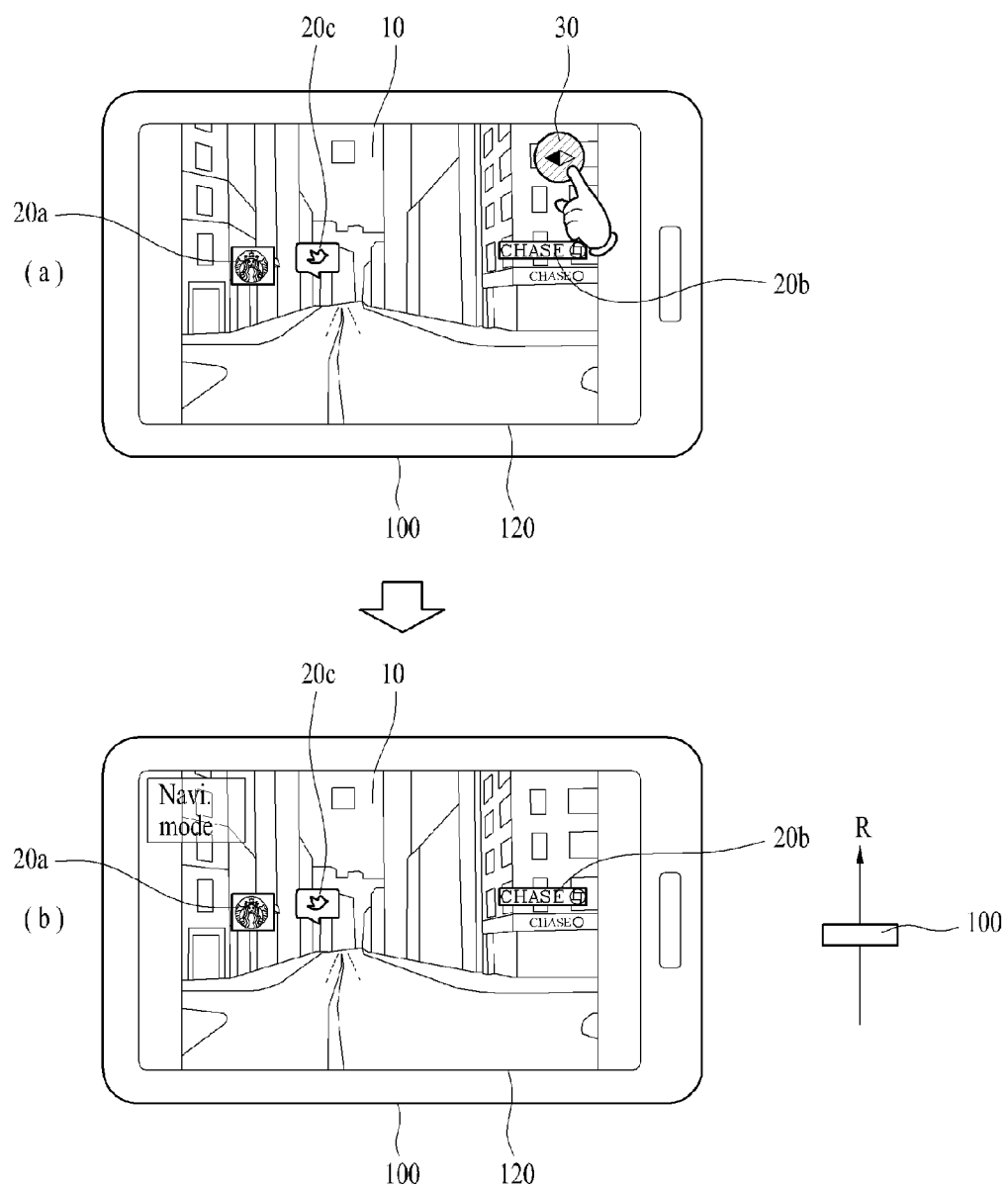
FIG. 8 is a diagram illustrating a method for setting a reference direction of a digital device in accordance with another embodiment of the present invention.

FIG. 8 is a diagram illustrating a method for setting a reference direction R of a digital device 100 to navigate virtual information 20 surrounded by a zone corresponding to image data 10 in accordance with another embodiment of the present invention.

According to the embodiment of FIG. 8, the digital device 100 may receive the user input for switching to the navigating mode of the virtual information 20. For example, the digital device 100 may provide a navigating mode switching interface 30 as shown in FIG. 8(a), and may receive the user input for the navigating mode switching interface 30. In a state that the digital device 100 displays the image data on the display unit 120, the digital device 100 may receive the user input for the navigating mode switching interface 30, and as a result, may switch the current mode to the navigating mode as shown in FIG. 8(b). The digital device 100 may set its direction when the user input is received to the reference direction R. Afterwards, the digital device 100 may detect at least one of the panning angle information and the tilting angle information with respect to the set reference direction R, and may display the virtual information 20 corresponding to the detected information in the target direction.

Figure 9:
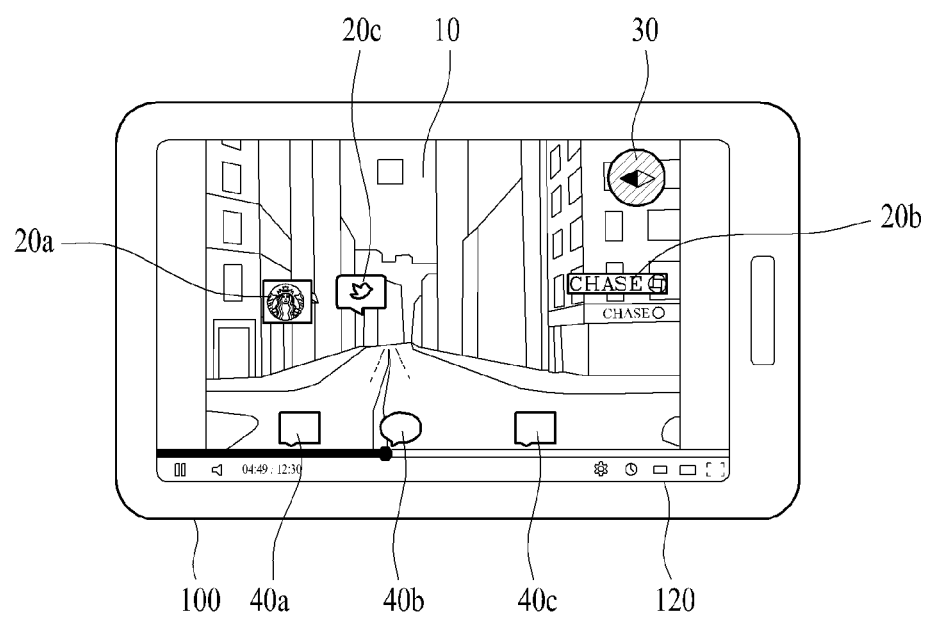
FIG. 9 is a diagram illustrating a method for providing an indicator indicating an image frame having virtual information in accordance with one embodiment of the present invention.

FIG. 9 is a diagram illustrating a method for providing contents in accordance with another embodiment of the present invention. Referring to FIG. 9, the digital device 100 may provide indicators 40a, 40b and 40c, which display an image frame having virtual information 20.

If the contents provided on the digital device 100 are moving pictures, the moving pictures may include a plurality of image frames. Each image frame of the moving pictures may be the image data 10 of the present invention. According to the embodiment of the present invention, the digital device 100 may display the indicators 40a, 40b and 40c displaying the frame of the image data 10 having the virtual information 20 on a timeline of the moving pictures. Each of the indicators 40a, 40b and 40c indicates that the image data of the image frame corresponding to the corresponding indicator includes at least one type of virtual information 20.

Also, according to another embodiment of the present invention, if there is virtual information updated after the image data 10 are recorded, the digital device 100 may display the indicator 40*b* indicating the image frame having the updated virtual information on the timeline of the moving pictures. In the embodiment of FIG. 9, the image data 10 includes the virtual information 20*c* updated after the corresponding image data 10 is recorded. Accordingly, the digital device 100 may display the indicator 40*b* corresponding to the image data 10 on the timeline. According to the embodiment of the present invention, the digital device 100 may provide only the indicator 40*b* of the image frame having the updated virtual information on the timeline. Alternatively, the digital device 100 may display the indicator 40*b* together with the indicators 40*a* and 40*c* of other image frames and control display attributes of the indicator 40*b* differently from those of the indicators 40*a* and 40*c*.

In the meantime, if the moving pictures have many image data 10 having the virtual information, the digital device may control display attributes of the corresponding indicator. For example, the digital device 100 may display the indicator corresponding to the frame of the image data having virtual information more than previously set information, on the timeline.

Figure 10:
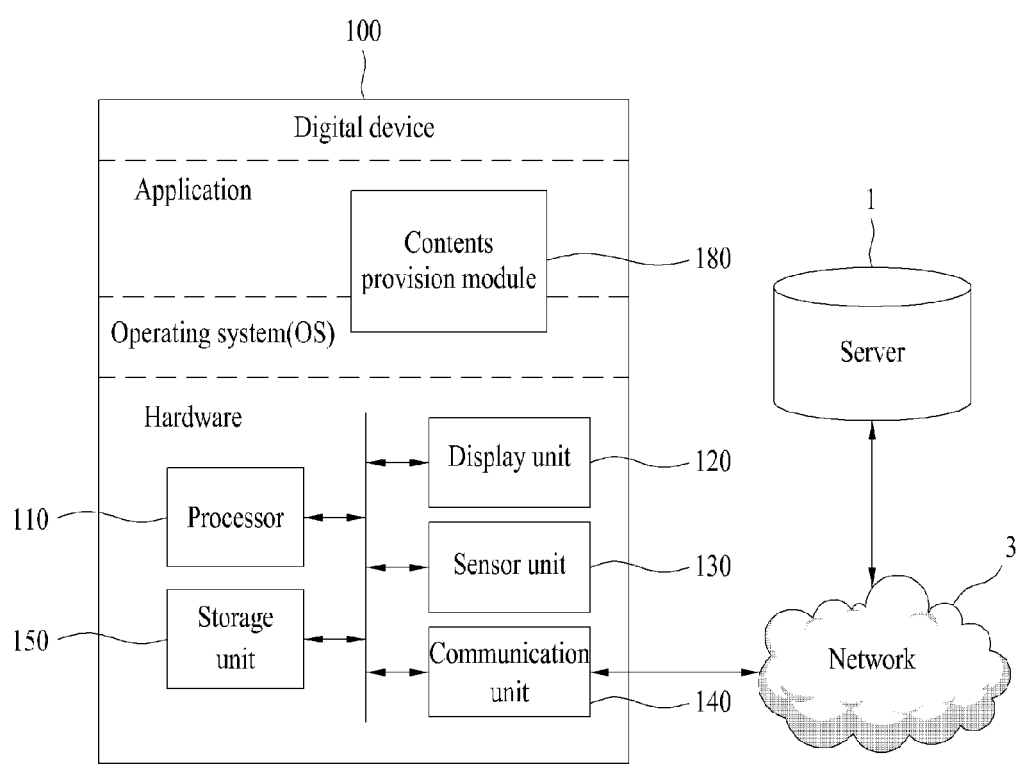
FIG. 10 is a block diagram illustrating a digital device according to the embodiment of the present invention.

FIG. 10 is a block diagram illustrating a digital device 100 according to the embodiment of the present invention.

Referring to FIG. 10, the digital device 100 of the present invention may include a hardware layer, an operating system layer, and an application layer.

First of all, the hardware layer of the digital device 100 may include a processor 110, a display unit 120, a sensor unit 130, a communication unit 140, and a storage unit 150.

The display unit 120 outputs image data on a display screen. The display unit 120 may output images on the basis of a control command of the processor 110 or contents executed by the processor 110. In the embodiment of the present invention, the display unit 120 may display image data included in the contents executed by the digital device 100 and virtual information corresponding to the image data.

The sensor unit 130 may detect a surrounding environment of the digital device 100 by using at least one sensor provided in the digital device 100 and transfer the detected result to the processor 110. Also, the sensor unit 130 may detect the user input of the present invention and transfer the detected user input to the processor 110. At this time, the sensor unit 130 may include at least one sensing means. Examples of the at least one sensing means may include a gravity sensor, a terrestrial magnetism sensor, a motion sensor, a gyroscope sensor, an acceleration sensor, an infrared sensor, an inclination sensor, a brightness sensor, an altitude sensor, an odor sensor, a temperature sensor, a depth sensor, a pressure sensor, a bending sensor, an audio sensor, a video sensor, a global positioning system (GPS) sensor, and a touch sensor. The sensor unit 130 means various sensing means as described above, may sense various inputs of the user and user environment and transfer the sensed result to the processor 110 to allow the processor 110 to perform an operation based on the sensed result. The aforementioned sensors may be included in the digital device 100 as separate elements, or may be included in the digital device 100 by being incorporated into at least one or more elements.

Next, the communication unit 140 may transmit and receive data to and from an external device or server 1 by performing communication with the external device or server 1 using various protocols. In the present invention, the communication unit 140 may transmit and receive digital data, for example, contents to and from the server 1 or cloud by accessing the server 1 or cloud through a network 3. Also, in the embodiment of the present invention, the communication unit 140 may receive virtual information corresponding to position information of the image data from the server 1.

Next, the storage unit 150 of the present invention may store various digital data such as videos, audios, photos, files, and applications. The storage unit 150 means various digital data storage space such as a flash memory, a random access memory (RAM), and a solid state drive (SSD). In the embodiment of the present invention, the storage unit 150 may store various kinds of contents including image data. Also, the storage unit 150 may store contents received by the communication unit 140 from the external device or server.

The processor 110 of the present invention may execute the contents stored in the storage unit 150 or the contents received through data communication. Also, the processor 110 may execute various applications and process data inside the digital device 100. In the embodiment of the present invention, the processor 110 may drive a content provision module 200 and display the contents of the digital device 100 on the display unit 120 on the basis of a control command of the contents provision module 200. In addition, the processor 110 may control the respective units of the digital device 100 and control data transmission and reception between the units.

Next, the operating system layer of the digital device 100 may include an operating system that controls the respective units of the digital device 100. The operating system may allow the application of the digital device 100 to control and use the respective units of the hardware layer. The operating system prepares an environment, which may perform each application, by efficiently distributing resources of the digital device 100. In the meantime, the application layer of the digital device 100 may include at least one application. The application includes various types of programs to perform a specific task. The application may use resources of the hardware layer through assistance from the operating system.

According to the embodiment of the present invention, the digital device 100 includes a contents provision module 180 for providing contents including at least one image data. The contents provision module 180 may display image data included in the contents of the digital device 100 together with virtual information corresponding to the image data in accordance with the embodiment of the present invention. Also, the contents provision module 180 provides virtual information surrounded by the image data in response to direction change of the digital device 100. The virtual information is associated with a zone corresponding to the image data. In other words, the contents provision module 180 provides direction information of the image data and virtual information in the target direction based on direction change information of the digital device 100. In the present invention, the contents provision module 180 may be included in the operating system layer or application layer of the digital device 100. In other words, the contents provision module 180 may be embedded software built in the operating system layer of the digital device 100, or may be software included in the application layer.

The digital device 100 shown in FIG. 10 may be a current digital device that sets the reference direction R and detects direction change information in the embodiment of the present invention. Also, the digital device 100 is shown in FIG. 10 in such a manner that respective blocks are shown to logically classify elements of the digital device. Accordingly, the elements of the digital device may be provided as one chip or a plurality of chips depending on design of the device.

Figure 11:
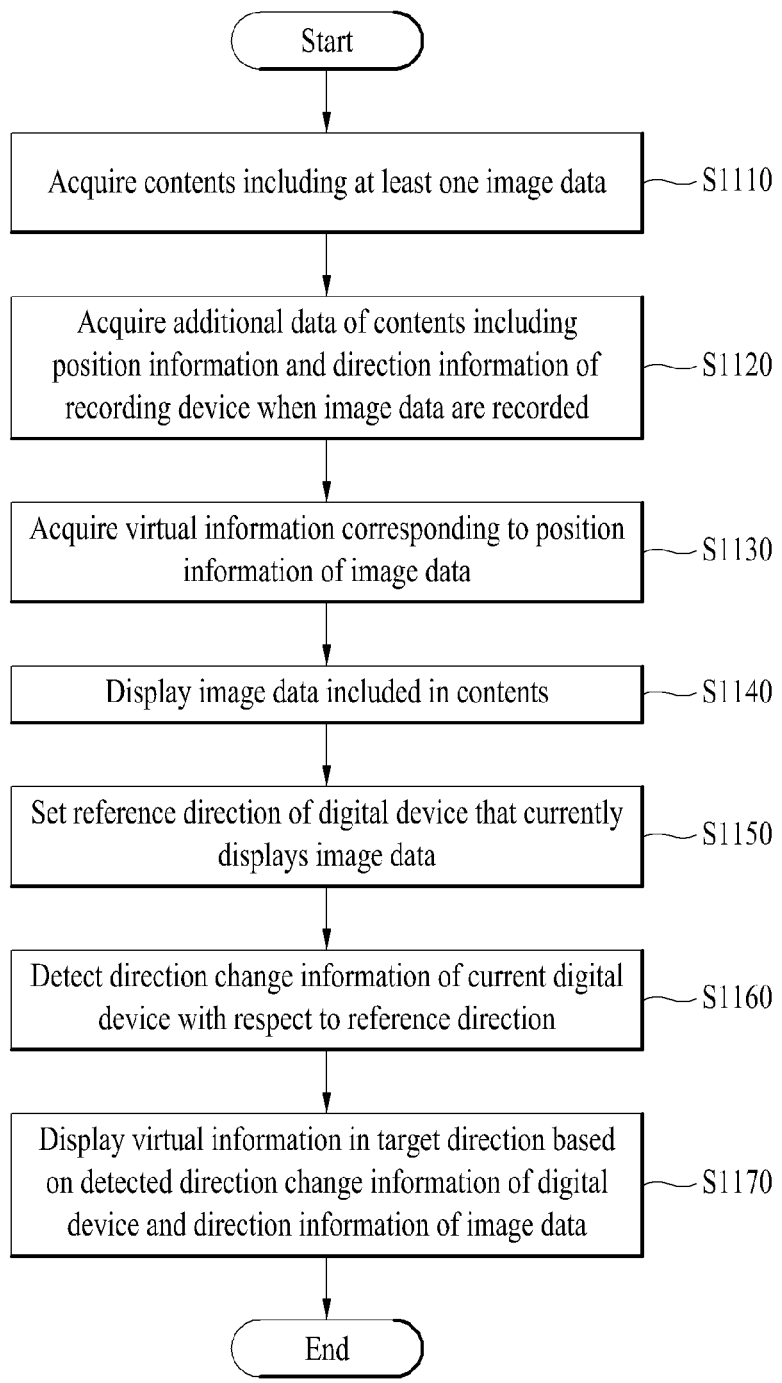
FIG. 11 is a flow chart illustrating a method for providing contents in accordance with the embodiment of the present invention.

FIG. 11 is a flow chart illustrating a method for providing contents in accordance with the embodiment of the present invention.

Each step of FIG. 11, which will be described hereinafter, may be performed by the digital device of the present invention. In other words, the processor 110 of the digital device 100 may control the respective steps of FIG. 11 on the basis of a control command of the contents provision module 180 of the digital device 100 shown in FIG. 10.

First of all, the digital device of the present invention acquires contents including at least one image data (S1110). In the embodiment of the present invention, examples of the contents include photos, moving pictures, and still images, and also include various types of contents including at least one image data. According to one embodiment of the present invention, the digital device may be the same device as the recording device 200 of FIG. 1. Accordingly, the digital device may acquire contents through the recording procedure described in FIG. 1. Also, according to another embodiment of the present invention, the digital device may receive the contents from the external device or server.

Next, the digital device acquires additional data of the contents (S1120). The additional data include position information and direction information of the recording device when the image data included in the contents are recorded. The position information of the recording device is the position information on the GPS, and the direction information of the recording device includes at least one of panning angle information and tilting angle information. The embodiment of the position information and the direction information of the recording device will be described with reference to FIG. 1. If the digital device is the same device as the recording device 200 of FIG. 1, it may acquire the position information and the direction information through the detecting procedure described in FIG. 1. Also, according to another embodiment of the present invention, the digital device may receive the position information and the direction information from the external device or server.

Next, the digital device acquires virtual information corresponding to position information of the image data (S1130). The virtual information includes augmented reality information on at least one object surrounded by a point corresponding to the position information. For example, the acquired virtual information may include augmented reality information of surrounding objects located within a predetermined distance based on the point corresponding to the corresponding position information. The surrounding objects may include objects located at every side based on the point. According to the embodiment of the present invention, the virtual information includes various kinds of augmented reality information. In other words, the virtual information may include information (for example, name, type of business and business hours of a corresponding store) on a specific building or store, and may include message information from the user or a follower of the user with respect to a specific building. Also, the virtual information may include current weather information of the corresponding point. According to one embodiment of the present invention, the digital device may receive the virtual information from the server. However, according to another embodiment of the present invention, the virtual information may be collected together with the image data when the recording device records the image data. At this time, the digital device may acquire the virtual information collected by the recording device together with the image data.

Next, the digital device displays the image data included in the contents (S1140). At this time, the digital device may display the virtual information corresponding to the image data, together with the image data, as described in more detail in FIG. 2.

Next, the digital device sets a reference direction of a current digital device that displays the image data (S1150). The current digital device means the digital device 100 that displays the image data 10 in FIG. 2 to FIG. 10. The reference direction is the direction of the current digital device at a specific timing point. In the embodiment of the present invention, the direction of the current digital device may be set in various manners as described with reference to FIG. 2. Also, in the embodiment of the present invention, the reference direction may be set at various timing points. For example, the digital device may set the direction of the current digital device to the reference direction at the time when the image data are paged. Alternatively, the digital device may set the direction of the current digital device to the reference direction at the time when a separate user input for navigating the virtual information is received. The virtual information is associated with a zone corresponding to the image data.

Next, the digital device detects direction change information of the current digital device with respect to the reference direction (S1160). The direction change information includes at least one of the panning angle information and the tilting angle information of the current digital device. The digital device may include at least one of a compass sensor and a gyroscope sensor, and may detect at least one of its panning angle and tilting angle in real time by using the sensor.

Next, the digital device displays the direction information of the image data and virtual information in the target direction based on the detected direction change information of the current digital device (S1170). In more detail, the digital device acquires the target direction by compensating for at least one of the panning angle information and the tilting angle information with respect to the direction information of the image data. The digital device displays the virtual information of a zone located in the target direction, from the received virtual information, through the display unit, as described in more detail with reference to FIG. 3 to FIG. 6.

In the present invention, the digital device includes a display unit such as a cellular phone, a PDA, a tablet computer, a digital camera, a camcorder, and other portable devices, and includes various kinds of devices that may output contents through the display unit.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

What is claimed is:

1. A method for providing contents, the method comprising the steps of:
   displaying a frame of image data and virtual information corresponding to at least one object on the frame of image data in a form of moving pictures, wherein the image data includes additional data including position information and direction information corresponding to the image data, and wherein the virtual information includes augmented reality information;
   receiving a user input corresponding to a switching to a navigating mode;
   pausing the step of displaying of the frame of image data and virtual information by the receiving of the user input;
   setting a reference direction of a digital device displaying the paused image data;

detecting direction change information of the digital device with respect to the reference direction; and displaying the image data based on the detected direction change information and the virtual information in a target direction based on the detected direction change information of the digital device and the direction information of the image data wherein displaying the frame of image data further includes displaying an indicator corresponding to the image data having more than previously set virtual information on a timeline of the moving pictures.

2. The method of claim 1, wherein the target direction is obtained by compensating the direction change information of the digital device for the direction information of the image data, and wherein the step of displaying virtual information includes displaying virtual information of a zone located in the target direction from the virtual information corresponding to the position information.

3. The method of claim 2, wherein the direction change information of the digital device includes at least one of panning angle information and tilting angle information of the digital device with respect to the reference direction.

4. The method of claim 1, wherein the step of setting a reference direction of the digital device includes setting a direction of the digital device at the time when the image data are paged to the reference direction.

5. The method of claim 1, wherein the step of setting a reference direction of the digital device includes setting a direction of the digital device at the time when the user input for navigating mode is received, wherein the virtual information is associated with a zone corresponding to the image data.

6. The method of claim 1, wherein the position information is position information on a global positioning system (GPS) of the digital device, and the direction information includes at least one of panning angle information and tilting angle information of the digital device.

7. The method of claim 6, wherein the direction information further includes altitude information of the digital device.

8. The method of claim 1, wherein the contents are photos.

9. The method of claim 1, further comprising the step of providing an indicator displaying the frame of image data having the virtual information on the timeline of the moving pictures.

10. The method of claim 1, further comprising the step of providing an indicator displaying the frame of image data having virtual information updated on the timeline of the moving pictures.

11. The method of claim 1, further comprising the step of receiving surrounding view data corresponding to the position information of the image data, wherein the step of displaying the virtual information includes displaying the virtual information together with view data of a zone located in the target direction among the received surrounding view data corresponding to the position information.

12. A digital device comprising:
a processor controlling an operation of the digital device;
a display unit outputting an image on the basis of a command of the processor; and
a sensor unit sensing a direction of the digital device and transferring a sensed result to the processor,
wherein the processor is configured to:
display a frame of image data and virtual information corresponding to at least one object on the frame of image data in a form of moving pictures, wherein the image data includes additional data including position information and direction information corresponding to the image data, and wherein the virtual information includes augmented reality information, receive a user input corresponding to a switching to a navigating mode, pause the displaying of the frame of image data and virtual information by the receiving of the user input, set a reference direction of the digital device displaying the paused image data, detect direction change information of the digital device with respect to the reference direction, and display the image data based on the detected direction change information and the virtual information in a target direction based on the detected direction change information of the digital device and the direction information of the image data, wherein the processor is configured to display an indicator corresponding to the image data having more than previously set virtual information on a timeline of the moving pictures.

13. The digital device of claim 12, wherein the target direction is obtained by compensating the direction change information of the digital device for the direction information of the image data, and the processor displays virtual information of a zone located in the target direction from the virtual information corresponding to the position information.

14. The digital device of claim 13, wherein the direction change information of the digital device includes at least one of panning angle information and tilting angle information of the digital device with respect to the reference direction.

15. The digital device of claim 12, wherein the processor sets a direction of the digital device at the time when the image data are paged, to the reference direction.

16. The digital device of claim 12, wherein the processor sets a direction of the digital device at the time when the user input for navigating mode is received, wherein the virtual information is associated with a zone corresponding to the image data.

17. The digital device of claim 12, wherein the position information is the position information on a global positioning system (GPS) of the digital device, and the direction information includes at least one of palming angle information and tilting angle information of the digital device.

18. The digital device of claim 17, wherein the direction information further includes altitude information of the digital device.

19. The digital device of claim 12, wherein the contents are photos.

20. The digital device of claim 12, wherein the processor further provides an indicator displaying the frame of image data having the virtual information among the moving pictures on the timeline of the moving pictures.

21. The digital device of claim 12, wherein the processor further provides an indicator displaying the frame of image data having virtual information updated on the timeline of the moving pictures.

22. The digital device of claim 12, wherein the processor further receives surrounding view data corresponding to the position information of the image data, and displays the virtual information together with view data of a zone located in the target direction, among surrounding view data corresponding to the position information.

* * * * *